United States Patent [19]

Brane

[11] 4,379,053

[45] Apr. 5, 1983

[54] FILTER BYPASS VALVE ASSEMBLY

[76] Inventor: Earl P. Brane, 9470 Ulmerton Rd., Largo, Fla. 33541

[21] Appl. No.: 272,953

[22] Filed: Jun. 12, 1981

[51] Int. Cl.³ ............................................. B01D 27/10
[52] U.S. Cl. .................................... 210/234; 210/419; 210/424
[58] Field of Search ............... 210/136, 234, 240, 418, 210/419, 420, 421, 424

[56] References Cited

U.S. PATENT DOCUMENTS

| | | | |
|---|---|---|---|
| 2,681,147 | 6/1954 | Braswell | 210/418 X |
| 3,283,907 | 11/1966 | Whiting | 210/234 |
| 3,306,451 | 2/1967 | Kudlaty | 210/420 X |
| 3,853,761 | 12/1974 | McClory | 210/420 X |
| 4,172,796 | 10/1979 | Corder | 210/424 X |
| 4,189,385 | 2/1980 | Greenspan | 210/136 |

*Primary Examiner*—John Adee
*Attorney, Agent, or Firm*—Woodard, Weikart, Emhardt & Naughton

[57] ABSTRACT

A filter assembly having bypass valves to allow continued liquid flow during the removal and reinsertion of a new filter. The assembly includes a cylindrical filter housing threadedly mounted to a valve housing with a cylindrical filter removably mounted within the filter housing. The valve housing has an inlet connectable to a source of liquid. A first valve is rotatable from a filter position directing all liquid flow from the inlet to the filter to a bypass position directing all liquid flow from the inlet to the outlet of the assembly. A shut off valve prevents liquid flow into the filter when the first valve is in the bypass position.

2 Claims, 5 Drawing Figures

FILTER BYPASS VALVE ASSEMBLY

BACKGROUND OF THE INVENTION

This invention is in the field of valve assemblies for controlling water flow to and from a filter. In U.S. Pat. No. 3,853,761, issued to Robert M. McClory, there is disclosed a filter attachable to a water faucet for removing impurities from water. A push button actuated stem is operable to direct the liquid either through the filter or through a passage bypassing the filter. Likewise, in my pending U.S. patent application Ser. No. 213,822, filed Dec. 8, 1980, and entitled Self-Locking Filter Valve, I have disclosed a lever actuated valve stem combined with a filter assembly attachable to a water faucet.

In lieu of attaching a filter assembly directly to a faucet, it is possible to connect the filter assembly in line with the water pipe leading to the faucet. Such an arrangement is typically utilized when the filter is large. The filter within the assembly must be removed periodically for installation of a clean filter therby necessitating a valve to shut off the flow of water to the filter assembly. Additional piping and valves are necessary to bypass the filter assembly allowing for continual flow of water to the faucet. The additional piping and valves add to the cost as well as require additional space for installation. Disclosed herein is a filter assembly having bypass valves constucted therein to facilitate the non-interruption of the flow of water to the faucet while the filter is being exchanged.

SUMMARY OF THE INVENTION

One embodiment of the present invention is a device for filtering liquid comprising a main body having a liquid inlet and a liquid outlet with a filter passage therebetween, a filter removably mounted to the main body, first valve means movably mounted to the main body and movable between a filter position directing all flow from the inlet to the filter and a bypass position directing all flow from the inlet directly to the outlet bypassing said filter, and automatic valve means movably mounted in the main body and automatically moving from an open position allowing flow from the filter to the outlet when the first valve means is in the filter position to a closed position blocking flow between the filter and the outlet when the first valve means is in the bypass position.

Another embodiment of the present invention is a filter bypass valve assembly comprising a filter housing having an inlet connectable to a source of liquid, an outlet to allow the liquid to flow out of the housing and a bypass passage extending from the inlet to the outlet, a filter mounted to said housing, a manual valve movably mounted in the housing having a filter position directing all liquid from the inlet to the filter and a bypass position directing all liquid from the inlet through the bypass passage to the outlet, and an automatic shut off valve movably mounted in the housing and having an open position allowing liquid flow from the filter to the outlet and a closed position limiting liquid flow between the bypass passage and the filter.

It is an object of the present invention to provide a new and improved filter bypass valve assembly.

A further object of the present invention is to provide a water filter device having built-in valves to allow water flow bypassing the filter facilitating filter exchange.

Additional objects and advantages will be apparant from the following description.

DESCRIPTION OF THE PREFERRED EMBODIMENT

Figure 1:
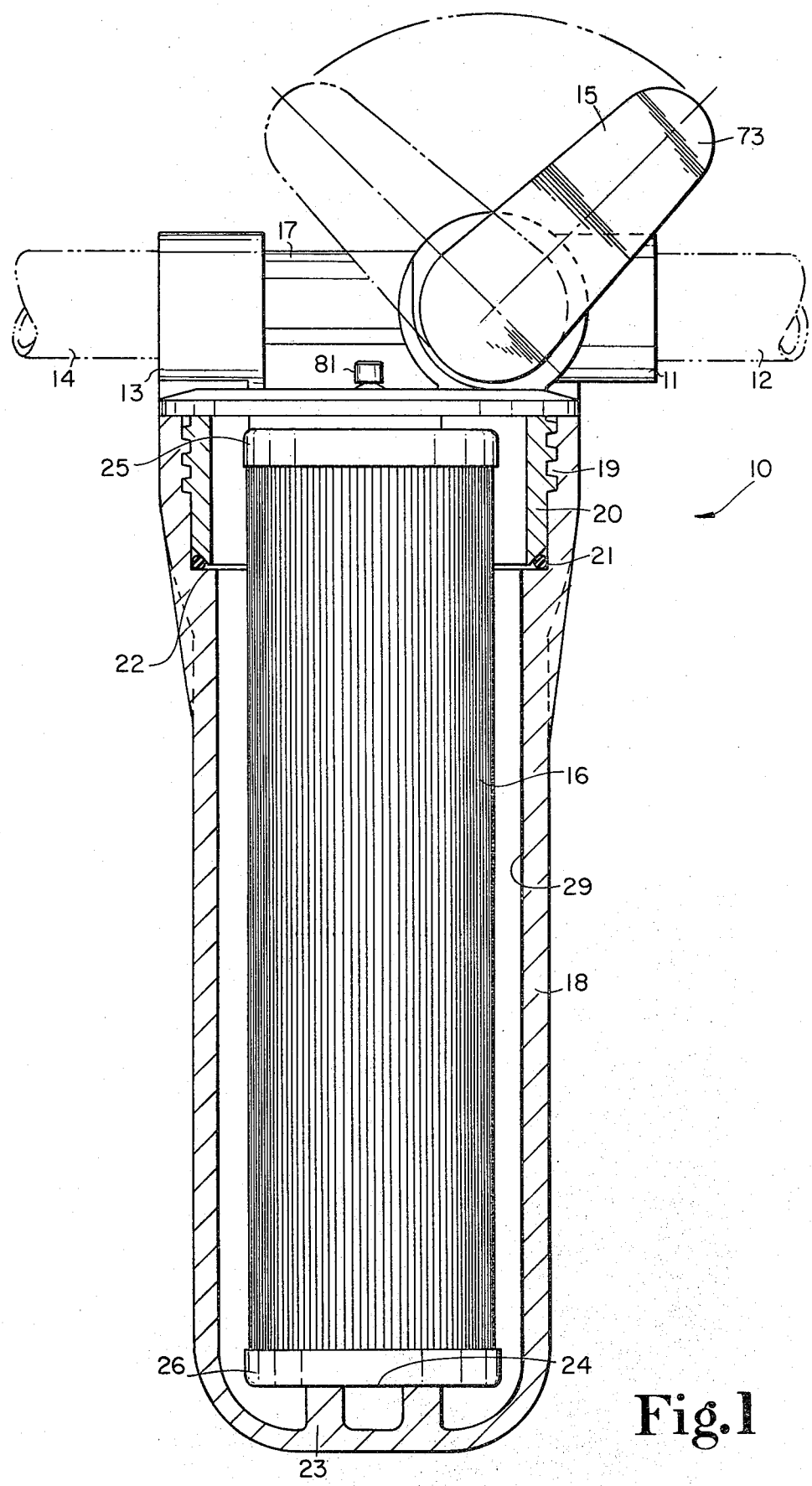
FIG. 1 is a fragmentary side view of the filter assembly incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a filter bypass valve assembly 10 with an inlet 11 connected to a source of water via pipe 12 and an outlet 13 allowing the water to flow from the assembly and into outlet pipe 14. A manually actuated main valve 15 is operable to control the flow of water from inlet 11 through a removable filter 16 mounted within assembly 10 to outlet 13.

Assembly 10 includes a main body or frame 17 threadedly receiving a cylindrical hollow filter housing 18. The filter housing and main body are shown fragmented in the drawings to more clearly illustrate the internal construction. The top end of filter housing 18 is provided with inwardly extending threads 19 in meshing engagement with outwardly extending threads 20 of main body 17. A conventional O-ring seal 21 is provided atop lip 22 and sealingly engages the beveled bottom end of main body 17 preventing the escape of liquid or water through the threads.

A ring configured upwardly extending ledge 23 is molded to the interior bottom surface of housing 18 to support the bottom end 24 of a commercially available filter 16. The filter includes a top and bottom ring 25 and 26 mountingly receiving the filter material 27 (FIG. 2) surrounding a center passage 28 extending the length of the filter. Filter material 27 is spaced apart from the inside surface 29 (FIG. 1) of housing 18 allowing the flow of water downwardly between the filter an housing with the water then flowing through the filter material 27 and into center passage 28.

Main body 17 includes a bypass passage 30 extending from inlet 11 to outlet 13 both of which are provided with inwardly extending threads to respectively receive the threaded ends of pipes 12 and 14. The manually actuated main valve 15 is located between inlet 11 and outlet 13 and has a filter position directing liquid flow from inlet 11 downwardly to filter 16 and a bypass position directing liquid flow from inlet 11 to outlet 13.

Figure 5:
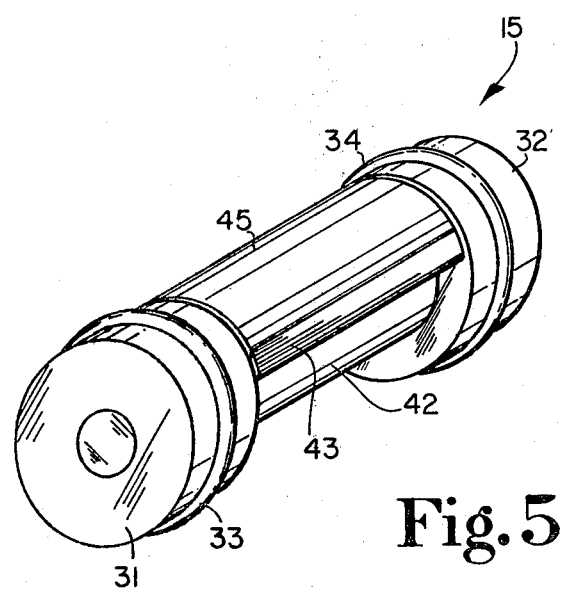
FIG. 5 is an enlarged perspective view of the manually actuated main valve.

A perspective view of main valve 15 is shown in FIG. 5. The valve includes a pair of spaced apart drums 31 and 32 having respectively conventional O-ring seals 33 and 34 mounted thereon and in sealing engagement with the interior surface of main body 17. The top wall 35 (FIG. 2) of main body 17 is raised having an interior surface 36 in contact with O-rings 33 and 34. Further, valve 15 is supported by a pair of spaced apart radiused surfaces 37 and 38 (FIG. 2) also in contact with the O-ring seals 33 and 34. A downwardly extending passage 39 is positioned between surfaces 37 and 38 and is in communication with inlet 11 when valve 15 is in the filter position shown in FIG. 2. Thus, the water flows into inlet 11 and downwardly in the direction of arrow 40 passing through the filter material 27 in the direction of arrow 41 and entering the center passage 28.

Hub 42 connects barrels 31 and 32 together and is of smaller diameter than the barrels. A pair of legs 43 and 44 (FIG. 2) extend outwardly from hub 42 and provide a space mountingly receiving a rubber elongated seal 45. Seal 45 has an outer surface 46 of the same radius as hubs 31 and 32 and thus engages surfaces 36 through 38 as the valve is rotated. In the position shown in FIG. 2, seal 45 engages surfaces 36 and 37 preventing the flow of liquid from inlet 11 into bypass passage 30 whereas with valve 15 positioned in the bypass position shown in FIG. 3, seal 45 sealingly engages surfaces 37 and 38 preventing liquid flow from inlet 11 and into filter passage 39. When valve 15 is in the bypass position, the flow of liquid is in the direction of arrows 50 flowing directly from inlet 11 into bypass passage 30 and exiting the valve assembly via outlet 13. A recess 51 is provided on the inward side of seal 45 with a curved spring washer 52 located within recess 51 urging seal 45 outwardly to sealingly engage surfaces 36 through 38. Other types of springs may be utilized other than a curved spring washer such as a helical spring.

Shut off valve 60 (FIG. 3) is provided to prevent backflow of liquid from bypass passage 30 and into filter 27. Shut off valve 60 is slidably mounted to shut off valve housing 61 in turn resting atop filter 16. Housing 61 includes a disc shaped flange 62 resting atop ring 25 of the filter with a downwardly extending portion 63 integrally attached to flange 62 and extending into center passage 28 of the filter. A conventional O-ring seal 64 is mounted to housing 61 and is in sealing engagement with main body 17 preventing liquid flow between housing 61 and main body 17.

Figure 2:
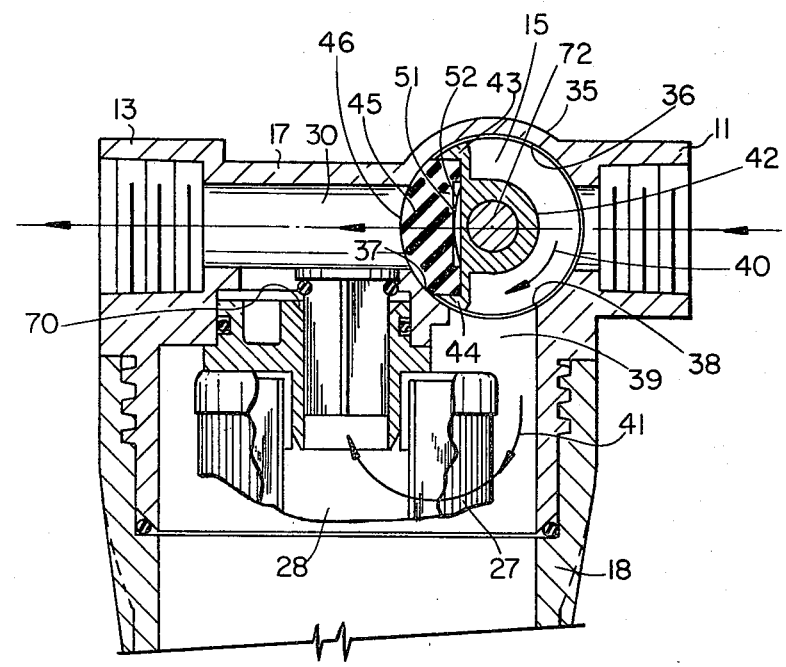
FIG. 2 is a fragmentary side view of the top portion of the assembly shown in FIG. 1 and illustrating the assembly in the filter position.
Figure 3:
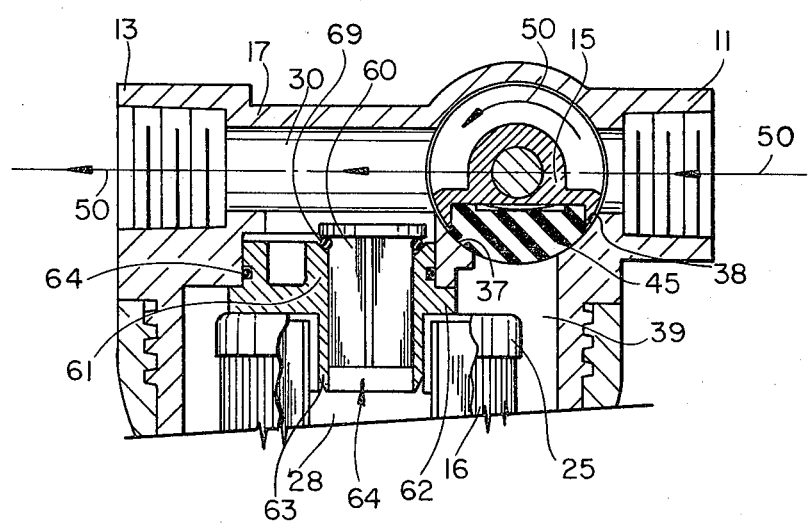
FIG. 3 is the same view as FIG. 2 only illustrating the assembly in the bypass position.
Figure 4:
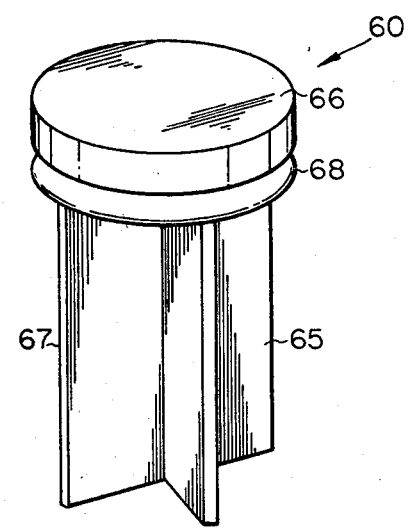
FIG. 4 is an enlarged perspective view of the shut off valve.

Shut off valve 60 (FIG. 4) has a button shaped head 66 integrally attached to a plurality of ribs 65 and 67 extending the length of the valve with the ribs received in passage 64 provided within projection 63 (FIG. 3). A conventional O-ring 68 is mounted to the main body of valve 60 immediately beneath head 66 and sealingly engages the bevel shaped top edge 69 (FIG. 3) surrounding center passage 64 of housing 61. Thus, with valve 60 in the downward position (FIG. 3) liquid flow is prevented from filter 27 into passage 30 and vice versa. Likewise, with valve 60 in the upward position (FIG. 2) liquid is allowed to flow upwardly through passage 28 of filter 16 and into bypass passage 30 as shown by arrow 70 (FIG. 2).

Axle 72 (FIG. 2) extends through hub 42 and is integrally attached to handle 73 with the opposite end of axle 72 threadedly receiving a truss head screw having an enlarged head abutting against the side of main body 17 and preventing axle 72 from disengaging hub 42. In addition, a key and keyway are provided or other suitable locking means in hub 42 and axle 72 to cause main valve 15 to rotate as handle 73 is moved from the filter position shown in FIG. 1 to the bypass position shown in dashed lines in FIG. 1. By removing the threaded fastener and slipping axle 72 out of hub 42, the axle may be slipped into the hub from the opposite side thereby mounting handle 73 on the opposite side of the filter assembly allowing for either right hand or left hand use.

A conventional air or liquid vent 81 is mounted to main body 17 and consists of an enlarged head integrally attached to a rod extending into the space between filter 16 and surface 29 of housing 18. The interior end of vent 81 is spring biased to the upward closed position allowing the operator to depress the vent to facilitate escape of liquid within housing 18 and relieving the pressure when valve 15 is in the bypass position and housing 18 is being removed from the main body.

Valve 15 thereby provides a valve means movable between a filter position to divert all flow from the inlet to the filter and a bypass position directing all flow from the inlet directly to the outlet via passage 30. Valve 60 provides an automatic valve means movably mounted in the main body and automatically moving from an open position to allow flow from the filter to the outlet via passage 30 when valve 15 is in the filter position with valve 60 then moving to a closed position blocking flow between the filter and outlet when valve 15 is in the bypass position. The passage formed in valve 15 by the reduced diameter of hub 42 provides a passage in communication with inlet 11 at all times with the passage being movable to allow liquid flow either into passage 30 or into passage 39 leading to filter 16. Valve 60 is automatically moved due to the line pressure of the liquid flowing into the valve assembly. For example, when valve 15 is in the bypass position, liquid line pressure within passage 30 forces valve 60 downwardly whereas with valve 15 in the filter position the inrushing liquid forces valve 60 upwardly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:
1. A device for filtering liquid comprising:
  a main body having a liquid inlet and a liquid outlet with a filter passage therebetween;
  a filter removably mounted to said main body;
  first valve means movably mounted to said main body and movable between a fiter position directing all flow from said inlet to said filter and a bypass position directing all flow from said inlet directly to said outlet bypassing said filter; and,
  automatic valve means movably mounted in said main body and automatically moving from an open position allowing flow from said filter to said outlet when said first valve means is in said filter position to a closed position blocking flow between said filter and said outlet when said first valve means is in said bypass position and wherein:
  said first valve means includes a first valve rotatably mounted to said main body and including a first passage in communication at all times with said inlet and movable to be in communication with said filter passage and said outlet respectively as said first valve means is in said filter position and said bypass position;

said first valve means includes a seal mounted thereto sealingly blocking flow between said inlet and said filter passage and said inlet and said outlet respectively when said first valve means is in said bypass position and said filter positions;

said first valve means includes a valve body with opposite end portions forming a pair of spaced apart drums with sealing means thereon in engagement with said main body, said first valve means further includes spring means positioned between said valve body and said seal with said seal movably mounted to said valve body with said spring means urging said seal against said main body closing said filter passage when said first valve means is in said bypass position but yieldable to allow said seal to move relative to said main body as said first valve means moves to said filter position, said seal and spring means along with said first passage are positioned between said drums.

2. The filter device of claim 1 wherein said automatic valve means includes a shutoff valve slidably mounted in said filter passage and further comprising:

a filter housing removably mounted to said main body and containing said filter having a center passage surrounded by filter material spaced from said housing and allowing liquid flow from said first valve means when in said filter position and between said filter housing and filter material, through said filter material to said center passage, said main body having an intermediate passage extending in a direction from said inlet past said center passage to said outlet; and a shut off housing position between an end of said filter and said main body and defining an opening in communication with said center passage slidably receiving said shut off valve, said shut off valve movable to said closed position to sealingly engage said housing when said first valve is in said bypass position applying liquid line pressure via said intermediate passage to said shut off valve, said shut off valve has an enlarged head and at least one rib extending in a direction from said head, said rib of said shut off valve extends into the center passage of said filter with said shut off valve movable only as a result of liquid pressure exerted thereon.

* * * * *